OR 3,877,781

United Stat[es Patent]
Kaminow

[11] 3,877,781
[45] Apr. 15, 1975

[54] ELECTRO-OPTICAL THIN-FILM DEVICE
[75] Inventor: Ivan Paul Kaminow, New Shrewsbury, N.J.
[73] Assignee: Bell Telephone Laboratories, Incorporated, Murray Hill, N.J.
[22] Filed: Jan. 16, 1974
[21] Appl. No.: 433,667

[52] U.S. Cl. .................. 350/96 WG; 350/160 R
[51] Int. Cl. ............................................. G02b 5/14
[58] Field of Search .................. 350/96 WG, 160 R

[56] References Cited
UNITED STATES PATENTS
| | | | |
|---|---|---|---|
| 3,695,745 | 10/1972 | Furukawa | 350/96 WG |
| 3,795,433 | 3/1974 | Channin | 350/96 WG |
| 3,795,434 | 3/1974 | Ash | 350/96 WG |
| 3,801,185 | 4/1974 | Ramaswamy et al. | 350/96 WG X |

OTHER PUBLICATIONS
Ash et al. "Switchable Optical Waveguide" IBM Technical Disclosure Bulletin, Vol. 14, No. 3, Aug. 1971, pages 999–1,000.

*Primary Examiner*—John K. Corbin
*Attorney, Agent, or Firm*—L. C. Canepa

[57] ABSTRACT

Three parallel longitudinally extending spaced-apart electrodes are formed on an electro-optic waveguiding thin film. The outer two electrodes are connected to one output terminal of a modulating signal source and the center electrode is connected to the other terminal thereof. The resulting electric field configuration in the thin film under the center electrode includes a component that is perpendicular to the thin film. This component is effective to modify the nature of an optical beam propagated longitudinally in the film under the center electrode. A phase or amplitude modulator for optical signals is thereby realized.

9 Claims, 7 Drawing Figures

3,877,781

ELECTRO-OPTICAL THIN-FILM DEVICE

BACKGROUND OF THE INVENTION

This invention relates to integrated optical devices and, more particularly, to an electrode structure for such devices.

Integrated optics is a recently developed technology in which thin-film techniques are applied to the fabrication of miniature compact optical devices. Due to their small size, rugged and reproducible construction and low cost, such devices are attractive candidates for inclusion in high-capacity optical communication systems.

For an overview of the field of integrated optics see, for example, "A Survey of Integrated Optics" by S. E. Miller, *IEEE Journal of Quantum Electronics*, Vol. QE-8, No. 2, Feb. 1972, pp. 199–205.

It is known to deposit electrodes on the surface of an electro-optic thin film to achieve electrical control of the properties of an optical signal propagating in the film. In one such conventional arrangement, two longitudinally extending spaced-apart electrodes are deposited on a substrate-supported electro-optic thin film. A focused optical beam is coupled to the film for propagation therein in a direction parallel to the electrodes. The beam is directed to traverse the film between and below the electrodes. By applying a voltage between the electrodes, an electrical field is established in the film. This field is oriented in the plane of the film perpendicular to the propagation path of the beam. In this way, modulation of the beam may be carried out in a variety of thin-film structures.

In some optical waveguiding thin films of practical importance, a maximum electro-optic effect is realized if the electric vector of the modulating field is oriented perpendicular to the plane of the thin film. One way of achieving this is to place one electrode on the surface of the thin film directly over the propagation path of the beam and to place a second electrode on the other surface of the substrate (the surface on which there is no thin film). The disadvantage of this approach is that a relatively high voltage is required to achieve a given degree of modulation in the thin film.

SUMMARY OF THE INVENTION

An object of the present invention is an improved electrode structure for an integrated optical device.

More specifically, an object of this invention is an electrode configuration for establishing in a selected portion of a waveguiding thin film an electric field that is oriented perpendicular to the plane of the film.

Briefly, these and other objects of the present invention are realized in a specific illustrative embodiment thereof that includes three parallel electrodes formed on an electro-optic waveguiding thin film. The outer two electrodes are connected to one output terminal of a modulating source and the center electrode is connected to the other terminal of the source. The resulting electric field pattern in the thin film under the center electrode includes a component that is perpendicular to the film. This component selectively alters the properties of the film and thereby changes the nature of an optical beam propagated longitudinally in the film under the center electrode.

BRIEF DESCRIPTION OF THE DRAWING

A complete understanding of the present invention and of the above and other objects thereof may be gained from a consideration of the following detailed description of several specific illustrative embodiments thereof presented hereinbelow in connection with the accompanying drawing in which.

DETAILED DESCRIPTION

Figure 1:
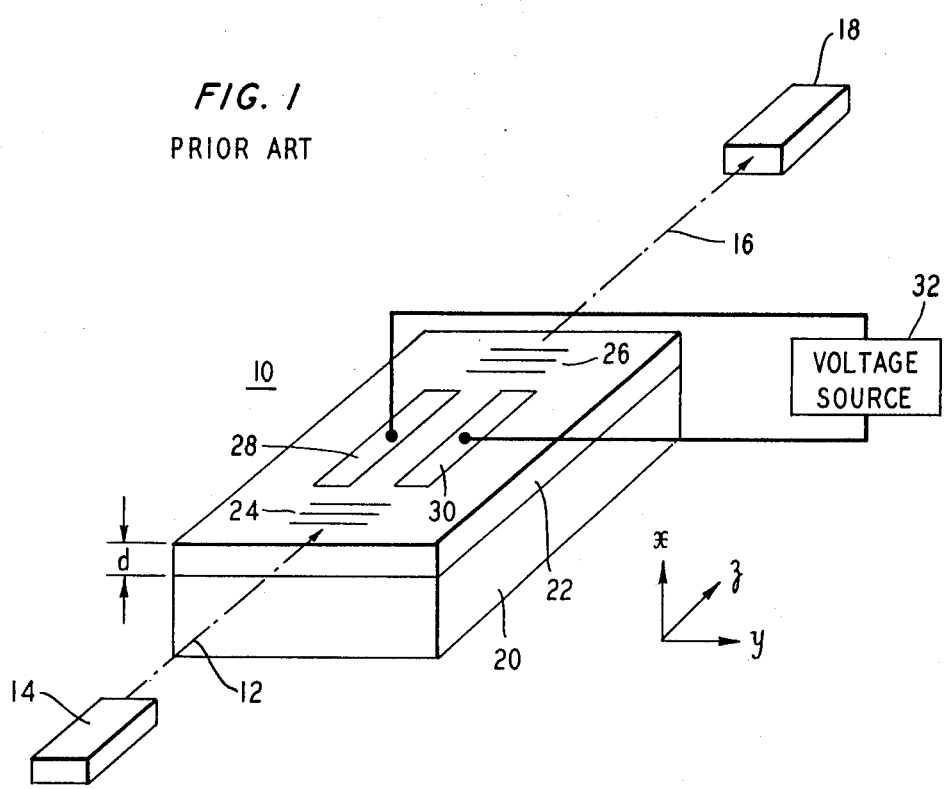
FIGS. 1 through 3 show various prior art electrode arrangements utilized in integrated optical devices.

FIG. 1 is a pictorial illustration of a prior art integrated optical device 10. The device 10 is positioned in the path of incident radiation (represented by dashed line 12) supplied by a light source 14. The radiation is typically coherent with wavelengths in the optical range (which includes visible and near-visible wavelengths) and may be provided by, for example, a laser. Any portion of the incident beam that is transmitted through the device 10 in the z direction propagates along an output path (indicated by line 16) to impinge upon an output utilization device 18.

The prior art device 10 of FIG. 1 includes a substrate 20 on which a thin film 22 of an electro-optic dielectric material is deposited. It is known that for the film 22 to support propagating optical modes and to act as a waveguide for light waves, the refractive index of the film 22 must be greater than that of the substrate 20. Both the indices are assumed to be greater than the refractive index of the air space above the device 10. If desired, a suitable covering layer (not shown) having an index of refraction less than that of the guiding film 22 may be deposited on the device to protect its upper surfaces and/or to provide a symmetrical guiding structure. The substrate 20 may, for example, be made of glass, with a suitable waveguiding layer or stripe of electro-optic material deposited on the substrate. But for purposes of a specific example herein it will be assumed that the substrate is instead made of $LiNbO_3$ which is an electro-optic material. Illustratively, the substrate is oriented such that the $c$ axis of the $LiNbO_3$ crystal is parallel to the $y$ axis shown in FIG. 1.

For a $LiNbO_3$ substrate, an optical waveguiding layer may be formed thereon by out-diffusion. The selective out-diffusion of $Li_2O$ in a substrate of $LiTaO_3$ or $LiNbO_3$ to form a surface-guiding layer is disclosed in a commonly assigned application designated J. R. Carruthers-I. P. Kaminow application Ser. No. 324,884, filed Jan. 18, 1973, now U.S. Pat. No. 3,837,827, issued Sept. 24, 1974. Alternatively, a waveguiding layer may be formed on the substrate 20 by epitaxially depositing a higher-index layer thereon.

Illustratively, the film 22 has a thickness $d$ approximating the wavelength of the radiation to be propagated therein, so that the radiation is effectively confined in the thickness dimension by the dielectric discontinuities provided by the major surfaces of the film, that is, the substrate-to-film and air space-to-film interfaces. The thickness of the film may be anywhere within the range of 0.1 to 100 times the wavelength to be propagated as measured in the waveguide, but is preferably between 1 and 10 times the wavelength.

Radiation supplied by the source 14 may be introduced into and extracted from the film 22 of the device 10 in any one of a variety of ways known in the art. For example, prism couplers of the type described in Applied Physics Letters, Vol. 14, page 291 (1969), may be utilized for that purpose. Advantageously, in applications in which miniaturization, ruggedness and simplicity are important, optical coupling and decoupling are accomplished by means of optical diffraction gratings formed directly on the surface of the guiding film 22 so as to be structurally integral therewith. Such couplers, which are, for example, described in A. Ashkin-E. P. Ippen U.S. Pat. No. 3,674,335, issued July 4, 1972, can be constructed to exhibit coupling efficiencies of better than 70 percent.

For illustrative purposes gratings 24 and 26, each depicted as a series of parallel lines, are respectively utilized in the prior art FIG. 1 device to couple optical waves into and out of the waveguiding film 22.

It is further known that an integrated optical device of the type shown in FIG. 1 may be operated as a modulator. This is achieved, for example, by placing metallic electrodes 28 and 30 on the surface of the waveguiding layer 22 and applying a modulating signal voltage therebetween by means of source 32, as described by I. P. Kaminow, J. R. Carruthers, E. H. Turner and L. W. Stulz, App. Phys. Lett. 22, 540 (1973). Such a device is capable of functioning as an efficient wideband phase modulator.

In the prior art modulator depicted in FIG. 1, an electric field is established between the electrodes 28 and 30 in the waveguiding film 22 in the $y$ direction. Such a field varies the extraordinary refractive index through the $r_{33}$ electro-optic tensor coefficient of $LiNbO_3$ and is effective to alter the phase of an input optical beam that is polarized parallel to the aforementioned $c$ axis and directed to propagate in the film 22 below and between the electrodes 28 and 30.

Figure 2:
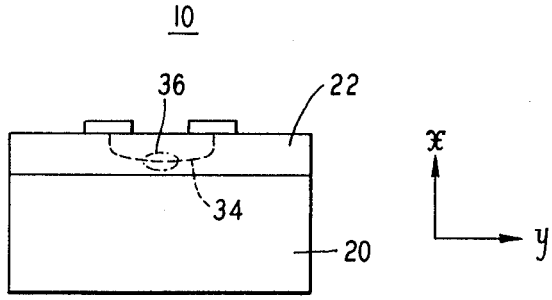

The electric field pattern established in the film 22 of FIG. 1 is indicated in FIG. 2 by dashed line 34. In addition, a cross-sectional representation of the optical beam propagated in the thin film 22 is indicated by oval 36. It is apparent that with respect to the beam 36 the modulating field 34 is oriented mainly in the $y$ direction, which as mentioned above makes use of the $r_{33}$ electro-optic tensor coefficient of $LiNbO_3$.

Figure 3:
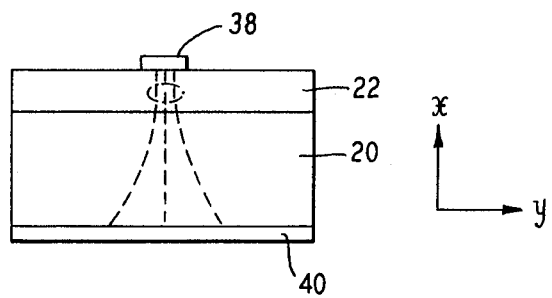

In some applications of practical importance, it is desired that the modulating field established in an optical waveguiding thin film in the region of the propagating beam be oriented in the $x$ rather than the $y$ direction. As illustrated in FIG. 3, this may be achieved simply by placing one electrode 38 on the top surface of the film 22 and a second electrode 40 on the bottom surface of the substrate 20. But since the thickness of the substrate is usually many times that of the film 22, this approach is generally disadvantageous in that an undesirably high voltage is required to establish a specified modulating field strength in the film 22.

Figure 4:
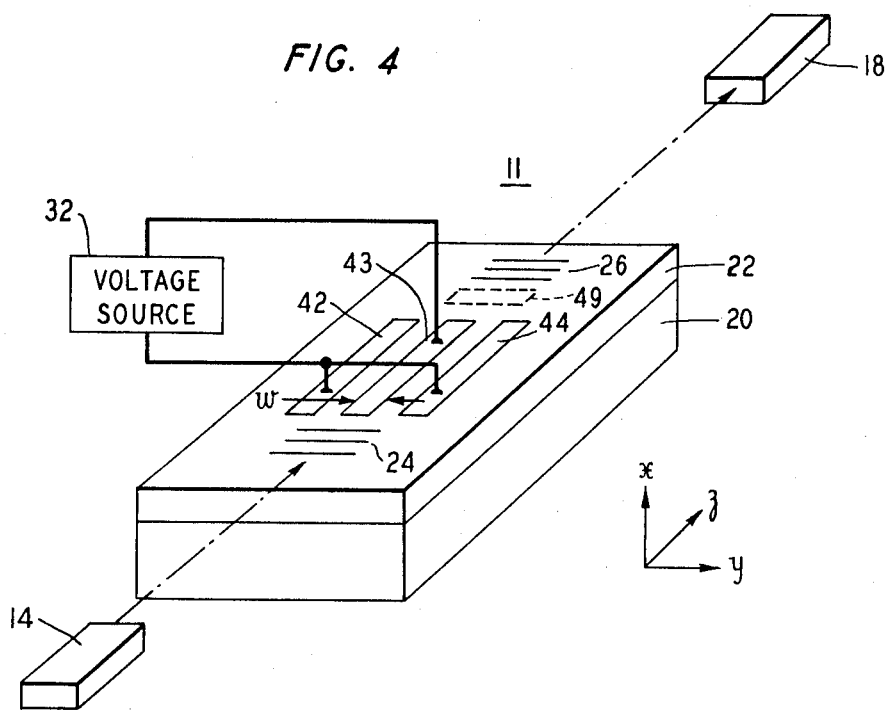
FIG. 4 depicts an integrated optical device including an electrode configuration made in accordance with the principles of the present invention.

In accordance with the principles of the present invention, a modulating field of a predetermined strength is established in the $x$ direction in an optical waveguiding thin film by means of a relatively low voltage. A specific illustrative structure 11 for accomplishing this is shown in FIG. 4. A number of the structural components depicted in FIG. 4 may be identical to elements previously described above. For ease of comparison these components are identified in FIG. 4 with the same reference numerals employed above. These components include input and output grating couplers 24 and 26, optical signal source 14, output utilization device 18 and modulating signal source 32. In addition, substrate 20 and thin film 22 shown in FIG. 4 are the same as the correspondingly numbered elements described above except that, as specified below, the orientation of the $c$ axis of the film 22 of the device 11 may be different than that in the devices of FIGS. 1 through 3.

For illustrative purposes, the optical waveguiding layer 22 of the device 11 shown in FIG. 4 is assumed to be formed by the out-diffusion process mentioned above. Further, in one specific example of a phase modulator, it is assumed that the substrate 20 comprises $LiNbO_3$ whose $c$ axis is oriented parallel to the $x$ axis. In this structural arrangement, the $r_{33}$ electro-optic tensor coefficient of $LiNbO_3$ may be utilized. Effective phase modulation in such an arrangement requires that an $x$-direction electric field be established in the film 22 in the region of a propagating beam.

In accordance with this invention, an $x$-direction modulating field is established in the film 22 of FIG. 4 by means of an electrode configuration that includes elements 42 through 44. In particular, the configuration comprises three spaced-apart conductive electrodes 42 through 44 disposed on the top surface of the thin film 22. The electrodes, whose longitudinal extent is in the $z$ direction, may be coated, evaporated, deposited, or otherwise formed on the film in any way known in the art. Illustratively, the electrodes 42 through 44 constitute aluminum stripes evaporated on the surface of the film 22 by standard photolithographic techniques.

An optical signal to be phase modulated by the device 11 of FIG. 4 is directed at the input coupler 24 by the source 14. Illustratively, the source comprises a 0.633-$\mu$m helium-neon laser whose output is polarized parallel to the aforementioned $c$ axis, i.e., parallel to the $x$ axis. Advantageously, the input signal is focused (for example by conventional optical components included in the source 14) to exhibit a lateral extent that is approximately less than or equal to the width $w$ of the center electrode 43. Such an input signal causes light to propagate in the film 22 in the fundamental or low order TM mode.

Figure 5:
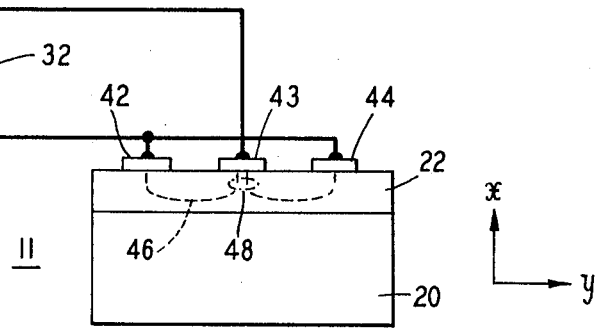
FIG. 5 is an end view of the FIG. 4 device.

The center electrode 43 of the FIG. 4 device is connected to one terminal of the modulating signal source 32 and the electrodes 42 and 44 are connected together and to the other terminal of the source 32. The resulting electric field pattern established in the film 22 in response to a voltage supplied by the source 32 is indicated in FIG. 5 by dashed line 46. In addition, an illustrative cross-section of the optical beam propagated in the film 22 is represented in FIG. 5 by oval 48. It is seen that with respect to the beam 48, modulating field 46 includes substantial components in the $x$ direction.

The $x$-direction electric field established in the film 22 of FIG. 5 is effective to cause phase modulation of the TM-mode optical signal propagating in the depicted device. A conventional heterodyne detection system of the type described, for example, in the aforecited article may be utilized to differentiate between phase-modulated and unmodulated signals. Such a system may be included in device 18 (FIG. 4).

The FIG. 4 device is also capable of being operated as an amplitude modulator. In this case the c axis of the electro-optic material of the waveguiding thin film 22 is oriented parallel to the y axis. In response to the application to the input coupler 24 of an input optical signal polarized parallel to the c axis, a fundamental or low order TE-mode wave is excited in the film 22. In this arrangement, the x-direction component of the modulating field couples the TE and TM modes through the $r_{51}$ electro-optic tensor coefficient of the thin film 22. As a result of this x-direction component, the propagating TE-mode optical signal is converted to a TM-mode wave polarized normal to the c-axis. In out-diffused $LiNbO_3$ such a TM wave is not guided and radiates into the substrate 20 and accordingly does not propagate to impinge upon the output device 18.

More generally, the FIG. 4 device may be adapted to distinguish between an unmodulated TE-mode signal and a modulated TM-mode signal by adding to the device 11 an output polarizer. The polarizer may, for example, be a standard such element positioned intermediate the devices 11 and 18. Alternatively, the polarizer may be simply a metal layer formed on the surface of the thin film 22 between the electrode 43 and the coupler 26. An illustrative polarizer of this latter type is shown in dashed outline in FIG. 4 as element 49 and is described by E. M. Garmire and H. Stoll, IEEE J. Quant. Electr., QE-8, 763 (1972). If the center electrode 43 is made of a moderately optically lossy metal, such as chromium or nickel, it may serve to absorb the TM-mode without seriously attenuating the TE-mode.

In a planar waveguiding structure of the type shown in FIGS. 4 and 5, there is no optical beam spreading normal to the plane (i.e., in the x direction). But some diffraction of the beam in the y direction will occur. To limit such diffraction, formation of a higher-index layer on the substrate 20 may be restricted to a longitudinal stripe surface region of the substrate. Under some conditions, the center metallic electrode 43 itself may produce some guidance in the plane by slowing the wave velocity beneath it. Or after forming a higher-index layer 22 on the entire top surface of the substrate 20, all or most of that layer except a narrow stripe or ridge portion may be selectively removed by etching or ion milling or other techniques. In these ways waveguiding action may be limited to a stripe in the device.

Figure 6:
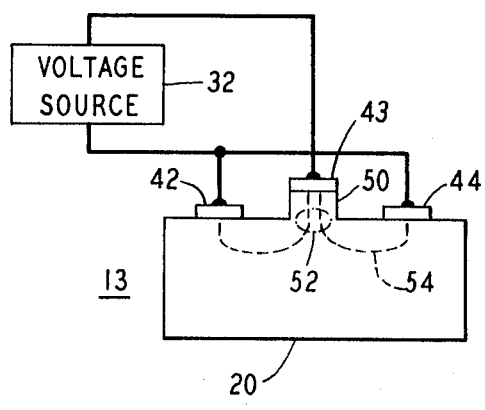
FIGS. 6 and 7 are end views of two other illustrative embodiments of the principles of this invention.

FIG. 6 shows an integrated optical device 13 including such an optical waveguiding ridge portion 50 formed on the substrate 20. In accordance with the principles of the present invention, the center electrode 43 of the three-electrode array described hereinabove is deposited on the electro-optic waveguiding portion 50 and the other two electrodes 42 and 44 are deposited directly on the substrate 20. As described above, waveguiding is substantially confined to the ridge portion 50. The propagating optical beam therein is represented in FIG. 6 by oval 52 and the electric field established in the device by the electrodes 42 through 44 is represented by dashed line 54. It is apparent that with respect to the beam 52 the modulating field includes a substantial x-direction component. Thus, the depicted device 13 is adapted to operate as a phase or amplitude modulator of the particular type described above.

Figure 7:
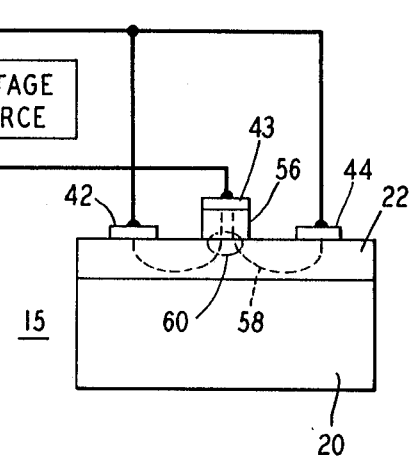

In FIG. 7 a longitudinal stripe 56 is deposited on an integrated optical device 15 including substrate 20 and thin film 22. The stripe 56 establishes in a narrow longitudinal region of the film 22 an effective index of refraction that is higher than the index of the remainder of the film. Accordingly, waveguiding action is confined to that portion of the film 22 that is directly below the stripe 56. This basic structure is described in a commonly assigned application designated I. P. Kaminow-H. W. Kogelnik application Ser. No. 381,985, filed July 23, 1973.

In accordance with the principles of the present arrangement, the center electrode 43 of the three-electrode array described hereinabove is deposited on the stripe 56 of FIG. 7 and the other two electrodes 42 and 44 are deposited on the surface of the thin film 22. The electric field configuration established by these electrodes is represented by dashed line 58. Reference numeral 60 represents an optical beam propagated in the film 22. As before, it is seen that with respect to the beam 60 the modulating field includes a substantial x-direction component.

It is to be understood that the various above-described arrangements are only illustrative of the application of the principles of the present invention. In accordance with these principles, numerous other arrangements may be devised by those skilled in the art without departing from the spirit and scope of the invention.

What is claimed is:

1. In combination in an integrated optical device, a substrate, electro-optic thin-film means on one surface of said substrate for propagating a laterally confined optical signal along a longitudinal path, and electrode means for establishing in a substantial extent of the longitudinal path of said thin-film means a modulating electric field that is oriented perpendicular to said one surface and confined to said thin-film means and the immediate region of the one surface of said substrate, wherein said electrode means comprises three longitudinally extending parallel spaced-apart electrodes on the top surface of said device, the center one of said electrodes being disposed on said thin-film means over and parallel to said longitudinal path, so that optical signals propagated along said longitudinal path are propagated directly under said center electrode, and means for coupling optical signals to said device to propagate therein in said thin-film means directly under said center electrode only.

2. A combination as in claim 1 wherein said thin-film means comprises a thin film on the entire one surface of said substrate, and further including first electrical contact means connected to said center electrode and adapted to be connected to one terminal of a two-terminal modulating signal source, and second electrical contact means directly connecting together said other two electrodes and adapted to be connected to the other terminal of said source.

3. A combination as in claim 2 further including a two-terminal modulating signal source, and means connecting said first contact means to one terminal of said source and said second contact means to the other terminal of said source.

4. A combination as in claim 1 wherein said thin-film means comprises a longitudinal thin-film waveguiding ridge on the one surface of said substrate, and wherein the center one of said electrodes is disposed on said ridge and the other two electrodes are disposed on the one surface of said substrate, and further including first electrical contact means connected to said center electrode and adapted to be connected to one terminal of a two-terminal modulating signal source, and second electrical contact means directly connecting together said other two electrodes and adapted to be connected to the other terminal of said source.

5. A combination as in claim 4 further including a two-terminal modulating signal source and means connecting said first contact means to one terminal of said source and said second contact means to the other terminal of said source.

6. A combination as in claim 1 wherein said thin-film means comprises a planar thin film on the entire one surface of said substrate, and further including a longitudinal stripe on said planar thin film for defining in said thin film a waveguiding portion below said stripe, and wherein the center one of said electrodes is disposed on said stripe and the other two electrodes are disposed on said planar thin film, and further including first electrical contact means connected to said center electrode and adapted to be connected to one terminal of a two-terminal modulating signal source, and second electrical contact means directly connecting together said other two electrodes and adapted to be connected to the other terminal of said source.

7. A combination as in claim 6 further including a two-terminal modulating signal source, and means connecting said first contact means to one terminal of said source and said second contact means to the other terminal of said source.

8. In combination in an electro-optical thin-film device, a substrate, an electro-optic thin-film waveguiding layer on said substrate, said layer being adapted to propagate an optical signal along a reference axis thereof, and electrode means disposed only on one surface of said device, said electrode means comprising three parallel spaced-apart electrodes, the middle one of said electrodes being disposed on said layer directly above and parallel to said reference axis, wherein optical signals coupled to said device are propagated along a longitudinal path including said reference axis, said path in said layer lying directly under said middle electrode, and further including first electrical contact means connected to said middle electrode and adapted to be connected to one terminal of a two-terminal modulating signal source, and second electrical contact means directly connecting together said other two electrodes and adapted to be connected to the other terminal of said source.

9. A combination as in claim 8 further including a two-terminal modulating signal source, and means connecting said first contact means to one terminal of said source and said second contact means to the other terminal of said source.

* * * * *